(12) United States Patent
Mäckle et al.

(10) Patent No.: US 9,221,625 B2
(45) Date of Patent: Dec. 29, 2015

(54) CONVEYING PIPE AND METHOD FOR PRODUCING A CONVEYING PIPE

(75) Inventors: Raimund Mäckle, Esslingen (DE); Karl Westermann, Walddorfhässlach (DE)

(73) Assignee: ESSER WERKE GMBH & CO KG, Warstein (DE)

( * ) Notice: Subject to any disclaimer, the term of this patent is extended or adjusted under 35 U.S.C. 154(b) by 278 days.

(21) Appl. No.: 13/876,095

(22) PCT Filed: Sep. 5, 2011

(86) PCT No.: PCT/DE2011/001683
§ 371 (c)(1),
(2), (4) Date: Mar. 26, 2013

(87) PCT Pub. No.: WO2012/048673
PCT Pub. Date: Apr. 19, 2012

(65) Prior Publication Data
US 2013/0183106 A1    Jul. 18, 2013

(30) Foreign Application Priority Data

Sep. 27, 2010   (DE) .......................... 10 2010 046 542

(51) Int. Cl.
*F16L 21/00* (2006.01)
*B65G 51/18* (2006.01)
(Continued)

(52) U.S. Cl.
CPC ................ *B65G 51/18* (2013.01); *B23P 11/00* (2013.01); *F16L 13/004* (2013.01); *F16L 13/103* (2013.01); *F16L 13/14* (2013.01); *F16L 23/024* (2013.01); *B29C 65/483* (2013.01); *B29C 65/565* (2013.01);
(Continued)

(58) Field of Classification Search
USPC ............. 29/458; 156/293, 294; 285/399, 915, 285/328
See application file for complete search history.

(56) References Cited

U.S. PATENT DOCUMENTS 5,360,239 A * 11/1994 Klementich .................... 285/94
5,962,616 A * 10/1999 Fujimoto et al. ................ 528/24
2006/0118327 A1   6/2006 Barker et al.
(Continued)

FOREIGN PATENT DOCUMENTS

CN         1977124 A     6/2007
CN       101426703 A     5/2009
(Continued)

OTHER PUBLICATIONS

International Search Report issued by the European Patent Office in International Application PCT/DE2011/001683.
(Continued)

*Primary Examiner* — Aaron Dunwoody
(74) *Attorney, Agent, or Firm* — Henry M Feiereisen LLC

(57) ABSTRACT

A conveying pipe for transporting solids includes a pipe body and a pipe collar connected to at least one end of the pipe body. The pipe collar and the pipe end are coupled to each other by an interference fit at least in some sections in a coupling region in a longitudinal direction of the pipe body. In the coupling region, an anaerobically hardening adhesive is optionally arranged in craters or depressions. The conveying pipe is produced by roughening the pipe collar inner surface and/or the pipe end outer surface in a coupling region, cleaning the pipe collar inner surface and/or the pipe end outer surface, applying an anaerobic hardenable adhesive the pipe collar inner surface and/or the pipe end inner surface, and pressing the pipe collar onto the pipe end and/or pressing the pipe end into the pipe collar.

16 Claims, 2 Drawing Sheets

(51) Int. Cl.
*B23P 11/00* (2006.01)
*F16L 13/00* (2006.01)
*F16L 13/10* (2006.01)
*F16L 13/14* (2006.01)
*F16L 23/024* (2006.01)
*B29C 65/56* (2006.01)
*B29C 65/00* (2006.01)
*B29C 65/48* (2006.01)

(52) U.S. Cl.
CPC ....... *B29C 66/02245* (2013.01); *B29C 66/1222* (2013.01); *B29C 66/1224* (2013.01); *B29C 66/5344* (2013.01)

(56) References Cited

U.S. PATENT DOCUMENTS

| | | |
|---|---|---|
| 2009/0121475 A1 | 5/2009 | Esser |
| 2010/0139077 A1* | 6/2010 | Linzell ............................ 29/525 |

FOREIGN PATENT DOCUMENTS

| | | |
|---|---|---|
| DE | 19607871 A1 | 9/1996 |
| DE | 19649414 A1 | 6/1997 |
| DE | 102007013126 A1 | 10/2007 |
| DE | 10 2009 024 126 | 12/2010 |
| EP | 0618040 A1 | 10/1994 |
| EP | 1 653 139 | 5/2006 |
| GB | 2455565 A | 6/2009 |
| JP | 9-153316 A | 6/1997 |
| JP | 11-230443 | 8/1999 |
| JP | 2009-174615 | 8/2009 |
| WO | WO2010/071259 A1 | 6/2010 |

OTHER PUBLICATIONS

Translation of Chinese Search Report with respect to counterpart Chinese patent application 201180038122.4.

* cited by examiner

CONVEYING PIPE AND METHOD FOR PRODUCING A CONVEYING PIPE

CROSS-REFERENCES TO RELATED APPLICATIONS

This application is the U.S. National Stage of International Application No. PCT/DE2011/001683, filed Sep. 5, 2011, which designated the United States and has been published as International Publication No. WO 2012/048673 and which claims the priority of German Patent Application, Serial No. 10 2010 046 542.9, filed Sep. 27, 2010, pursuant to 35 U.S.C. 119(a)-(d).

BACKGROUND OF THE INVENTION

The present invention relates to a conveying pipe for transportation of solids. The present invention also relates to a method of producing a conveying pipe.

The conveyance of solids, for example building materials, concrete, gravel and sand, is carried out pneumatically or hydraulically in pipelines which are assembled of multiple interconnected conveying pipes. Solids within the scope of this invention can be also materials that are present in a fluid form. For example, concrete mixtures and also sewage sludge mixtures can be considered as such.

For the coupling of the conveying pipes, they are provided with flanges or pipe collars at corresponding ends. The connection of the conveying pipes with the pipe collars is obtained either by coupling clamps or by bolts in pipe collars provided with bores.

In practice, almost all conveying pipes have pipe collars that are welded with pipe bodies. The heat effect during the welding process can however cause adverse structural changes in the conveying pipe in the connection region.

Another embodiment involves gluing of the pipe collar. DE 196 07 871 C1 discloses a conventional conveying pipe in which the pipe collars are glued to the entire outer surface of the pipe end. As a result, a heat effect is avoided by thermal joining. Practice has shown however that the service life of such glued connections repeatedly causes problems. Moreover, at high pressures or vibrations in the region of the glue joints, leaks or even sudden failure of the connection joint can occur.

In particular tolerance differences between the pipe collars and an inconsistent quality of the glue connection are causes of this.

Defective conveying pipes must be exchanged, resulting in an interruption of the conveying operation.

SUMMARY OF THE INVENTION

The invention is therefore based on the object to provide a conveying pipe that has a cost-favorable and easy-to-implement connection with constant quality between a pipe collar and a conveying pipe when compared with the state of the art, while maintaining high production accuracy at the same time.

According to one aspect of the invention, the afore-mentioned object is attained by a conveying pipe which includes a pipe body, a pipe collar provided at least on one end, wherein the pipe collar and the pipe body at least in sections are coupled by an interference fit in a coupling region oriented in a longitudinal direction of the pipe body, wherein the pipe collar is constructed stretchable in the coupling region and that the pipe collar inner surface and/or the pipe end outer surface have in the coupling region at least in sections a roughness between 20 and 70 µm, particularly preferably between 30 and 60 µm, and in particular between 40 and 50 µm.

Advantageous embodiments of the present invention are subject matter of the dependent claims.

The conveying pipe in accordance with the invention for the transportation of solids, having a pipe body with a pipe collar connected at least at one end, is characterized in that the pipe collar and the pipe end are coupled with each other, at least in sections in a coupling region oriented in a longitudinal direction of the pipe, by an interference fit. The wall thickness of the pipe collar in the coupling region is therefore selected smaller than or equal to the wall thickness of the pipe end.

The pipe collar itself is formed stretchable in the coupling region. This means that an interference fit is produced by the coupling of the pipe end with the pipe collar. The interference fit is produced as a result of an expansion or widening of the pipe collar.

The inner surface of the pipe collar and/or the outer surface of the pipe end in the coupling region has at least in some sections a roughness between 20 and 70 µm, particularly preferably between 30 and 60 µm and in particular between 40 and 50 µm. Within the scope of the invention, roughness is to be understood as the roughness depth of a surface. A surface that has craters and depressions is produced by an abrasive treatment of the surface, such as sanding, blasting or similar roughening processes. The craters and depressions extend in the previously specified tolerance region in a radial direction with respect to the highest points of the surface.

In a preferred embodiment, the wall thickness of the pipe collar is selected smaller than or equal to the wall thickness of the pipe end.

The wall thickness of the pipe collar in the coupling region ideally is selected just as thin so as to satisfy the requirements of the operational pressure strength of the later pipe. The wall thickness in the coupling region is therefore always smaller than and/or equal to the wall thickness of the pipe end. In a multilayer pipe, the wall thickness refers to the outwardly located pipe of the pipe end. As a result of the smaller wall thickness of the pipe collar, widening of the pipe collar during press fitting does not affect the geometrical dimensions of the pipe end. Within the tolerance limits of the interference fit, an interference fit is thereby always guaranteed without influencing the inner diameter of the pipe end. Damage to the pipe end is thereby avoided.

Within the scope of the invention, the material of the pipe collar can have smaller strength or hardness than the material of the pipe end. These material properties also lead to an expansion or turning of the pipe collar. In particular with the selection of the material of the pipe collar, it is possible in the connection of an end of a conveying pipe with a pipe collar produced in accordance with the present invention, to couple a multi-layer pipe with a stretchable pipe collar.

It is also particularly advantageous within the scope of the invention to select a pipe collar that has a combination of the afore-mentioned features. In this embodiment, the pipe collar has ideally a wall thickness that is smaller than or equal to a wall thickness of the pipe end and at the same time is composed of a softer or more ductile material than the pipe end. It is thereby guaranteed that the interference fit is produced by an expansion of the pipe collar. A shrinkage or contraction of the pipe end is thereby largely avoided.

With the interference fit in combination with an expansion of the pipe collar undesired hardening or decrease in hardening in the region of the heat-affected zone as a result of a thermal joining are avoided.

It is to be understood within the scope of the invention that an interference fit is a fit in which the greatest dimension of the passage through the pipe collar in any case is equal to or smaller than the smallest outer diameter of the pipe. As a result of manufacturing tolerances in the region of the interference fit, there is always at least a zero gap. The outer diameter of the pipe is therefore always greater than or equal to the inner diameter of the pipe collar. Preferably, the interference fit is provided substantially over the entire length of the coupling region between the inner surface of the pipe collar and the outer surface of the pipe end. It is especially preferred, when the coupling region has a length in the longitudinal direction of the pipe between 0.01 and 30 cm, particularly preferred between 0.1 and 20 cm and in particular between 0.5 and 10 cm.

The inner diameter of pipe collar in the coupling region is selected so that an interference fit is produced at all times, even when utilizing the diameter tolerances of the inner surface of the pipe collar and the outer surface of the pipe. With consideration of the manufacturing tolerances of the pipe end and the pipe collar, an interference fit formed over the entire length of the coupling region always ensures from a manufacturing viewpoint a fixed seat of the pipe collar.

An adhesive is preferably arranged between the inner surface of the pipe collar and the outer surface of the pipe end, preferably an anaerobically hardening adhesive. This provides in particular the advantage that in addition to the forced connection of the interference fit, an adhesive bond is formed between the inner surface of the pipe collar and the outer surface of the pipe end. In accordance with the invention, the adhesive is arranged in the craters and depressions that are formed by the afore-stated roughening. Thus, an adhesive gap is established by the craters and/or depressions for disposition of the anaerobically hardening adhesive. The adhesive inside the adhesive gap is always shielded from the atmosphere because of the at least zero dimension of the adhesive gap. The presence of an anaerobically hardening adhesive ensures that the adhesive is hardened and its adhesive force is deployed, even when it has no contact with the atmosphere in the coupling region as a result of the interference fit.

The combination of the adhesive with a forced connection enables a significantly improved service life and tightness when compared with conventional glued connections. In particular multi-layer pipes of metallic or also other materials, for example composite materials or similar materials, can be permanently and snugly coupled with a pipe collar. Single-layer or multi-layer pipe bodies can be connected with a pipe collar within the scope of the invention.

It is especially advantageous that the components cannot slide during the hardening process of the adhesive bond.

A slanted run-on surface is preferably formed on the pipe collar. The slanted run-on surface guarantees that during relative pressing of the pipe collar with the pipe end, the pipe is aligned coaxially to the pipe collar. This alignment is provided in form of a self-centering. A further advantage is that the applied adhesive that is located on the inner surface of the pipe collar and/or on the outer surface of the pipe end is sheared off during the pressing process due to the interference fit, but is repeatedly applied by the slanted run-on surface on the region of the pipe end which is inserted into the pipe collar. An especially good distribution of the adhesive film to be applied is thereby guaranteed during the pressing-in process by the slanted run-on surface.

In a further preferred embodiment, the pipe collar has a stop surface. A stop in the interior of the adhesive bond limits the pressing path and therefore simplifies the maintenance of a desired pipe length. A further provided advantage is that the stop surfaces permit introduction of further components, such as for example anti-wear rings, into the connection.

According to another aspect of the invention, the aforementioned object is attained by a method according to the invention for producing a conveying pipe for transportation of solids has following process steps:

providing a pipe body and a pipe collar,
roughening the inner surface of the pipe collar and/or the outer surface of the pipe end in the coupling region,
cleaning the inner surface of the pipe collar and/or the outer surface of the pipe end,
applying an anaerobically hardening adhesive on the inner surface of the pipe collar and/or the outer surface of the pipe end,
pressing the pipe collar onto the pipe end and/or pressing the pipe end into the pipe collar.

With the inventive method, a particularly easy-to-produce connection between a pipe collar and a pipe end is established. The connection is characterized by a cost-efficient manufacture combined with high production accuracy as well as long service life and very good tightness properties.

A roughening within the scope of the present invention involves the treatment of a surface with abrasive means. Examples involve grinding or blasting, for example sand blasting, glass bead blasting, corundum blasting or ice blasting for the production of a desired roughness. Within the scope of the invention, it is basically possible to carry out the individual method steps only on one of the afore-mentioned surfaces or also in combination on both surfaces. The selection as to whether only one surface or both surfaces are treated depends on the requirements for tightness and durability of the conveying pipe to be produced and on the used materials.

A further advantage provided by the method according to the invention for coupling a pipe collar with a conveying pipe and a further advantage realized by the produced conveying pipe are that both the pipe collar and the conveying pipe in terms of material can have different materials. For example, the coupling of a metal pipe collar with a pipe body of composite material is possible. It is also possible within the scope of the invention to couple a metal pipe collar with a metal pipe body. Further materials which can be used include for example rubber-like materials, light metal materials or also other plastics and composites.

Cleaning is to be understood within the scope of the present invention as cleaning of the roughened surfaces. This may involve a mechanical cleaning, for example the removal of chips by compressed air, or chemical cleaning, for example rinsing or washing off of the surface to be treated with a special cleaner. Cleaning has a positive effect on the adhesion property of the surface with the adhesive.

The anaerobically hardening adhesive is applied on the inner surface of the pipe collar and/or the outer surface of the pipe end. The adhesive bond in combination with the forced connection of the pressed-on pipe collar has an especially advantageous effect on the tightness and longevity of the produced pipe connection.

Within the scope of the invention, pressing is to be understood as relating to a pressing of the pipe collar onto the pipe end. Furthermore, it is to be understood within the scope of the invention that the pipe end is pressed into the pipe collar. Of course, a combination of pressing-on and pressing-in can take place. This depends primarily on the dimensioning of the components to be pressed or on the material selection. Furthermore, pressing is to be understood within the scope of the invention as relating to the realization of an interference fit between the pipe collar and the pipe end. The interference fit can hereby be provided in a tolerance region for the interference fit as known in the manufacturing technique.

In a further preferred embodiment, the surface is treated with an activator, in terms of time, before, during and/or after the cleaning. Activator is to be understood within the scope of the present invention to relate to a chemical or also physical treatment of the surface. A chemical treatment can be performed for example by a chemical additive to render the inner surface of the pipe collar or also the outer surface of the pipe especially acceptable for the used adhesive. Physical activation relates hereby for example to a heat treatment by which the corresponding surface is also rendered especially acceptable for a good contact with the adhesive.

In a further preferred embodiment, a self-adjustment is implemented during pressing of the pipe collar and the pipe end by the slanted run-on surface. The advantages provided by the slanted run-on surface on the pipe collar apply analogously for this method step. Within the scope of the invention, an slanted run-on surface on the pipe end is also conceivable. It is formed as a chamfer on an outer end of the pipe. The afore-mentioned advantages apply analogously.

In a particularly preferred embodiment of the method according to the invention, the pressing-in force and/or pressing-on force are controlled in dependence on the tolerance of the interference fit. The presence of a rough centering of the pipe collar and the pipe body suffices before pressing. The pipe collar during pressing is spontaneously aligned by the slanted run-on surface in coaxial relationship to the pipe end. The press-on device has to be constructed within the scope of the invention such as to allow the collar to self-adjust and at the same time to prevent a great tolerance.

The required pressing force depends significantly on the geometry of the collar and pipe and on the tolerance affecting interference of the fit between the pipe collar and the pipe end. Basically the pressing force has to be selected sufficiently great to ensure a reliable course of the continuously performed pressing process. However, it should not be too great to prevent damages to the stop or to the pipe end. Depending on the respective production tolerances of the interference fit, the force for pressing of the pipe collar and the pipe end is variably controllable so as to apply a high pressing force, when for example the interference is high, and in relation thereto, to apply a lower pressing force for a lower interference fit.

The anaerobically hardening adhesive is applied on the inner surface of the pipe collar and/or on the outer surface of the pipe end. The adhesive bond in combination with the forced connection of the pressed-on pipe collar is especially advantageous for the tightness and longevity of the produced pipe connection.

BRIEF DESCRIPTION OF THE DRAWING

Further advantages, features, properties and aspects of the present invention are obtained from the following description. Preferred embodiments are shown in the schematic drawings. They serve for ease of understanding of the invention. It is shown in.

DETAILED DESCRIPTION OF PREFERRED EMBODIMENTS

Same reference signs are used in the figures for same or similar parts, with corresponding or comparable advantages being obtained even when a repeating description is omitted forsake of simplicity.

Figure 1:
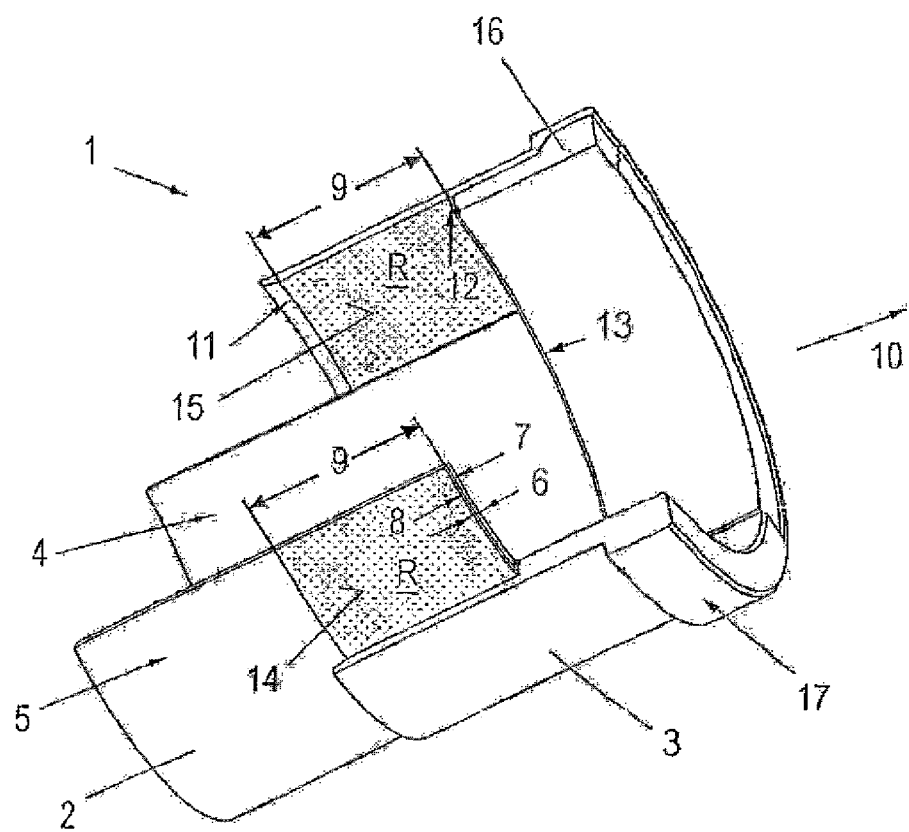
FIG. 1 shows a perspective sectional view of a pipe end according to the invention.

FIG. 1 shows a section of a conveying pipe 1 including a multi-layer pipe body 2 with a pipe collar 3 coupled on an end of the pipe body 2. The multi-layer pipe body 2 includes hereby an inner pipe 4 and an outer pipe 5. The pipe body 2 has a total wall thickness 6 as well as a wall thickness 7 of the inner pipe 4 and a wall thickness 8 of the outer pipe 5. A pipe collar 3 is pressed onto the pipe end 1 by interference in a coupling region 9 that extends in a longitudinal axis 10 of the conveying pipe 2.

In relation to the drawing plane, a slanted run-on surface 11 is formed at the left-hand side of the pipe collar 3. At its right-hand side, the coupling region 9 is bounded in the pipe collar 3 by a stop 12. The pipe end 1 abuts with its end surface 13 against the stop 12 of the pipe collar 3. A not shown optional adhesive is arranged in the coupling region 9 between the outer surface 14 of the pipe end and the inner surface 15 of the pipe collar.

The outer surface 14 of the pipe end and the inner surface 15 of the pipe collar have a roughness R in the coupling region 9. An anti-wear ring 16 is located in the pipe collar 3 at the side of the stop 12 that is opposite to the end of the pipe body 2. In the example shown here, the pipe collar 3 is provided with a coupling collar 17 for coupling with a further conveying pipe using a coupling clamp. It is however also conceivable that the pipe collar 3 has other coupling options.

Figure 2:
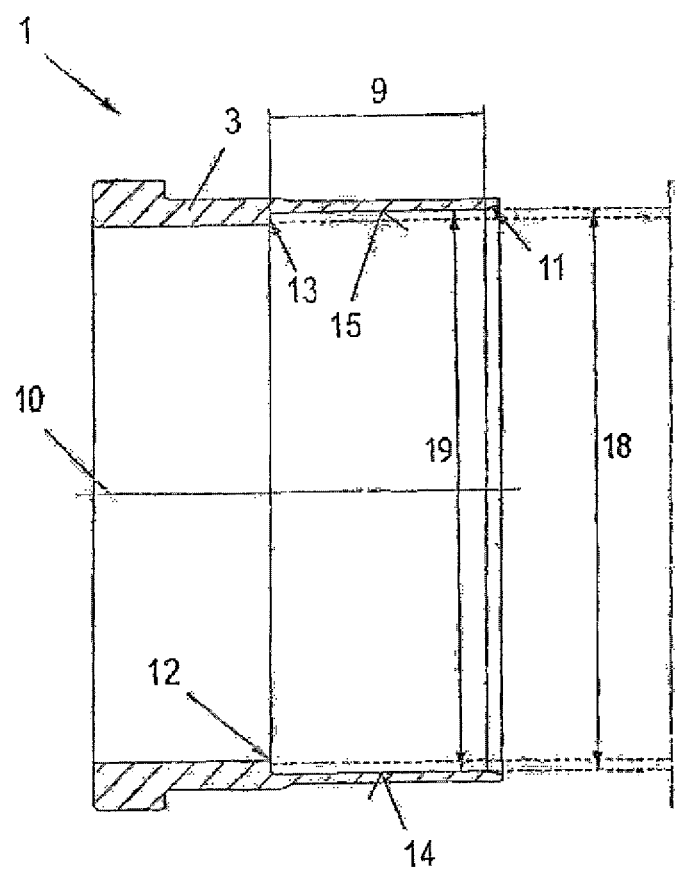
FIG. 2 shows a longitudinal section through a pipe collar according to the invention with indicated pipe body.

FIG. 2 shows a coupling collar 3 and, illustrated in dashed lines, an end of a single-layer conveying pipe 1 by way of a longitudinal sectional view. This again clearly shows that the end of the conveying pipe 1 borders with its end surface 13 on the stop 12 of the pipe collar 3. The outer surface 14 of the pipe end has a greater diameter 18 than the diameter 19 of the inner surface 15 of the pipe collar between the coupling region 9 bounded between the stop 12 and the slanted run-on surface 11.

REFERENCE SIGNS

1—conveying pipe
2—pipe body
3—pipe collar
4—inner pipe
5—outer pipe
6—wall thickness of 2
7—wall thickness of 4
8—wall thickness of 5
9—coupling region
10—longitudinal axis
11—slanted run-on surface
12—stop
13—end surface
14—outer surface of pipe end
15—inner surface of pipe collar
16—anti-wear ring
17—coupling collar
18—diameter of 14
19—diameter of 16
R—roughness

What is claimed is:

1. A conveying pipe for transportation of solids, comprising:
a pipe body having a pipe end and an outer surface;
a pipe collar having an inner surface and connected to the pipe end by an interference fit in at least one section of a coupling region oriented in a longitudinal direction of the pipe body, said pipe collar being constructed stretchable in the coupling region so that the interference fit is produced by coupling of the pipe end with the pipe collar, the inner surface of the pipe collar being configured at least in one section of the coupling region with a roughness between 20 and 70 μm; and an anaerobic hardening adhesive applied between the inner surface of the pipe collar and the outer surface of the pipe end and arranged in craters and depressions of the roughness.

2. The conveying pipe of claim 1, wherein the roughness is between 30 and 60 μm.

3. The conveying pipe of claim 1, wherein the roughness is between 40 and 50 μm.

4. The conveying pipe of claim 1, wherein the pipe collar has in the coupling region a wall thickness which is smaller than or equal to a wall thickness of the pipe end.

5. The conveying pipe of claim 1, wherein the pipe collar is made of a material having a strength or hardness which is smaller than a strength or hardness of a material of the pipe end.

6. The conveying pipe of claim 1, wherein the interference fit is provided substantially over an entire length of the coupling region between the inner surface of the collar and the outer surface of the pipe end.

7. The conveying pipe of claim 1, wherein the coupling region has a length between 0.01 and 30 cm.

8. The conveying pipe of claim 1, wherein the coupling region has a length between 0.1 and 20 cm.

9. The conveying pipe of claim 1, wherein the coupling region has a length between 0.5 and 10 cm.

10. The conveying pipe of claim 1, wherein the pipe collar had a slanted run-on surface.

11. The conveying pipe of claim 1, wherein the pipe collar has a stop surface.

12. The conveying pipe of claim 1, wherein the outer surface of the pipe end is configured at least in one section of the coupling region with a roughness between 20 and 70 μm.

13. A method of producing a conveying pipe for transportation of solids, comprising:

roughening an inner surface of a pipe collar which is stretchable in a coupling region;

cleaning a member selected from the group consisting of the inner surface of the pipe collar and an outer surface of a pipe end;

applying an anaerobically hardening adhesive between the inner surface of the pipe collar and the outer surface of the pipe end so that the anaerobically hardening adhesive is arranged in craters and depressions of a roughness of the inner surface of the pipe collar; and pressing the pipe collar upon the pipe end or pressing the pipe end into the pipe collar and thereby connecting the pipe collar with the pipe end by an interference fit in at least one section of a coupling region oriented in a longitudinal direction of the pipe body with use the stretchability of the pipe collar.

14. The method of claim 13, further comprising treating the member with an activator before, during, or after cleaning the member.

15. The method of claim 13, wherein the pressing step is accompanied by a self-adjustments caused by a slanted run-on surface of the pipe collar.

16. The method of claim 13, further comprising controlling a pressing force during the pressing step in dependence on a tolerance of the interference fit.

* * * * *